(No Model.)
H. J. PONATH.
VEGETABLE SLICER.
No. 377,909. Patented Feb. 14, 1888.
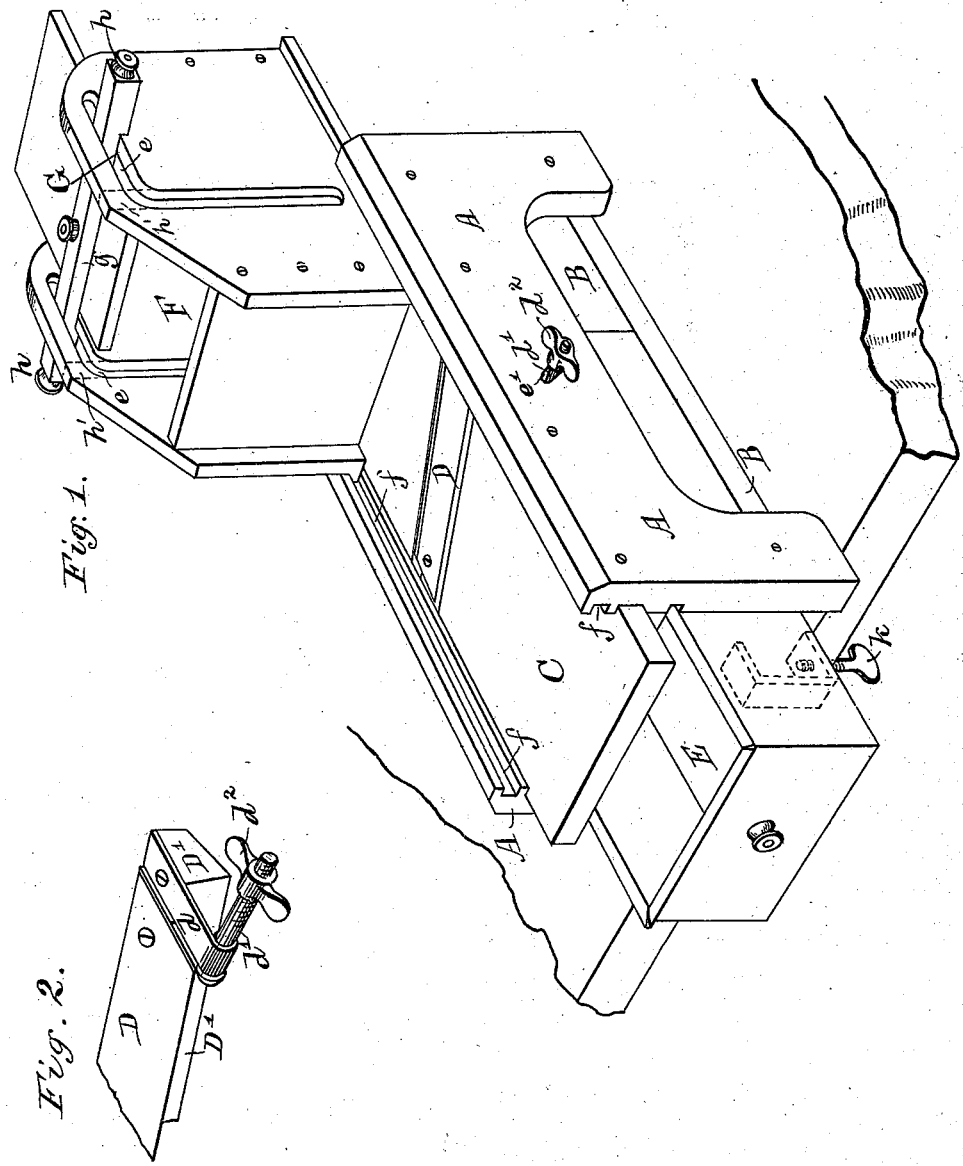
Witnesses:
Joseph Wachtel
E. C. Slevin
Inventor:
Henry J. Ponath.
per:
Chas. F. Meisner
Attorney.

UNITED STATES PATENT OFFICE.

HENRY J. PONATH, OF ST. LOUIS, MISSOURI.

VEGETABLE-SLICER.

SPECIFICATION forming part of Letters Patent No. 377,909, dated February 14, 1888.

Application filed May 2, 1887. Serial No. 236,890. (No model.)

*To all whom it may concern:*

Be it known that I, HENRY J. PONATH, a citizen of the United States, residing in St. Louis, in the State of Missouri, have invented certain new and useful Improvements in Vegetable-Slicers, of which the following is a specification.

My invention relates to vegetable-slicers having a horizontal blade or knife within a frame and a hopper sliding in guides on the frame and is moved back and forth to cut or slice vegetables.

The object of my invention is to improve the hopper and follower as well as to improve the means for adjusting the knife.

The improvements consist, first, in the hopper and its follower, by providing the former with a Γ-shaped slot at each of its two sides and the latter with a cross-piece which passes through these slots and forms handles for taking hold of when operating the machine and to keep a constant pressure on the vegetables contained in the hopper while cutting or slicing, and to avoid danger to fingers when the hopper is almost empty; second, in the new and novel manner of adjusting the blade or knife to cut slices of different thickness; and, lastly, in the detail construction of parts, all of which will hereinafter more fully appear and be claimed.

In the drawings, Figure 1 is a perspective view of my improved vegetable-slicer complete, showing the hopper pushed back to the rear, the follower raised for the introduction of vegetables, and the drawer partly open. Fig. 2 is a detail perspective view of the knife and adjusting-screw.

A is the sides of the frame of the machine, B the bottom, and C the top boards.

D is the horizontal blade or knife extending diagonally across the top board as usual.

E is the drawer.

F is the hopper, made, preferably, of the shape shown in Fig. 1 and moving back and forth in guides $f$ over the knife.

G is the follower. This follower consists of a rectangular board of the same size as the inside of the hopper, so as to fit and move up and down in same. This board is provided with a cross-piece, $g$, at the top, extending laterally across the same and through a slot, $e$, in each side of the hopper, and forms handles $h\ h$ at each end, as shown in Fig. 1.

To facilitate the introduction of the vegetables, I make the slots of the Γ shape, which allow the follower to be raised and pushed back and to rest on the rear wall of the hopper, as shown in Fig. 1, thus at the same time keeping the hopper and its follower always together and thereby avoiding possibility of losing or mislaying the latter at any time. When slicing vegetables, the follower is brought forward in the horizontal portion of the slots to the vertical portion of the same, and by taking hold of each end of the cross-piece at its handles a constant pressure is kept on the contents of the hopper while moving the latter back and forth.

The knife D, as shown in Fig. 2, is screwed to a cross-piece, D', one end of which is held to one wall of the frame by a screw, upon which it turns. To the opposite end of said cross-piece is secured an arm, $d$, extending forward along the other wall of the frame and under the top board, C. By a set-screw, $d'$, which passes through this arm and through a segmental slot, $e'$, in the side of the frame, the knife is adjusted or tilted up and down, so as to cut thicker or thinner slices, and is secured or held in such position by means of a thumb-screw, $d^2$, on the outside.

If desired, a series of two or more knives may be used in the same manner.

The machine when in use is placed on a table, as shown in Fig. 1, and held firmly in place by a clamp-screw, $k$, below.

What I claim is—

1. In a vegetable-slicer, the top board provided with a cutting-knife and a hopper which slides back and forth between the frame of the machine and above the top board, said hopper being provided with a follower having a cross-piece provided with handles and adapted to operate within slots in the sides of the hopper, said slots being made of the Γ shape shown for the purpose of allowing the follower to be pushed back out of the way and to rest on the rear wall of the hopper, substantially as and for the purpose set forth.

2. In a vegetable-slicer, the frame A, provided with a segmental slot, $e'$, and the top board, C, in combination with the knife D, secured to a cross-piece, D', the arm $d$, the bolt $d'$, passing through the segmental slot $e'$ in the frame A, and the nut $d^2$, for securing the knife D, substantially as herein shown and described, and for the purpose set forth.

HENRY J. PONATH.

Witnesses:
CHAS. F. MEISNER,
CHAS. E. METZ.